US010494529B2

(12) United States Patent
Perron-Bailly et al.

(10) Patent No.: US 10,494,529 B2
(45) Date of Patent: Dec. 3, 2019

(54) PRECURSORS FOR REFRACTORY PAINTS AND THEIR USE

(71) Applicant: ImerTech SAS, Paris (FR)

(72) Inventors: Vanessa Perron-Bailly, Toussieu (FR); Jérome Soudier, Vaux en Bugey (FR); Romain Techer, Villefontaine (FR)

(73) Assignee: ImerTech SAS, Paris (FR)

( * ) Notice: Subject to any disclaimer, the term of this patent is extended or adjusted under 35 U.S.C. 154(b) by 11 days.

(21) Appl. No.: 15/543,675

(22) PCT Filed: Jan. 13, 2016

(86) PCT No.: PCT/EP2016/050581
§ 371 (c)(1),
(2) Date: Jul. 14, 2017

(87) PCT Pub. No.: WO2016/113315
PCT Pub. Date: Jul. 21, 2016

(65) Prior Publication Data
US 2017/0369711 A1   Dec. 28, 2017

(30) Foreign Application Priority Data
Jan. 14, 2015 (EP) .................................... 15290006

(51) Int. Cl.
| *C09D 1/02* | (2006.01) |
| *C09D 7/61* | (2018.01) |
| *B22C 1/18* | (2006.01) |
| *C09D 1/06* | (2006.01) |
| *C09D 5/08* | (2006.01) |
| *C08K 3/22* | (2006.01) |
| *C03C 3/091* | (2006.01) |
| *C03C 8/02* | (2006.01) |
| *C03C 8/16* | (2006.01) |

(52) U.S. Cl.
CPC .................. *C09D 1/02* (2013.01); *B22C 1/18* (2013.01); *C03C 3/091* (2013.01); *C03C 8/02* (2013.01); *C03C 8/16* (2013.01); *C08K 3/22* (2013.01); *C09D 1/06* (2013.01); *C09D 5/08* (2013.01); *C09D 7/61* (2018.01)

(58) Field of Classification Search
CPC ... C09D 1/02; C09D 1/06; C09D 5/08; C09D 7/61; C03C 3/091; C03C 8/02; C03C 8/16; B22C 1/18; C08K 3/22
See application file for complete search history.

(56) References Cited

U.S. PATENT DOCUMENTS

| 2,516,892 | A | * | 8/1950 | Lobaugh | C04B 28/06 106/681 |
| 2,516,893 | A | * | 8/1950 | Lobaugh | C04B 28/02 501/124 |
| 4,088,502 | A | * | 5/1978 | La Bar | C04B 35/14 106/692 |
| 4,348,236 | A | * | 9/1982 | Hines, Jr. | C04B 28/06 106/38.27 |
| 6,126,737 | A | * | 10/2000 | Mason | C03C 17/008 106/38.3 |
| 6,984,597 | B2 | * | 1/2006 | Ackerman | C03C 1/105 501/27 |
| 2009/0324919 | A1 | * | 12/2009 | Lang | C23C 30/00 428/220 |

FOREIGN PATENT DOCUMENTS

| EP | 2 210 919 A1 | 7/2010 |
| EP | 2 690 078 A1 | 1/2014 |
| GB | 2 081 246 A | 2/1982 |
| WO | WO 89/11342 | 11/1989 |
| WO | WO 2005/005680 A2 | 1/2005 |

OTHER PUBLICATIONS

International Search Report and Written Opinion dated Apr. 28, 2016, in International Application No. PCT/EP2015/050581 (11 pgs.).

* cited by examiner

*Primary Examiner* — Anthony J Green
(74) *Attorney, Agent, or Firm* — Finnegan, Henderson, Farabow, Garrett & Dunner, LLP

(57) ABSTRACT

The present invention relates to a dry refractory paint precursor composition comprising, 5 to 55 wt.-% mineral filler, 20 to 45 wt.-% glass frit comprising $SiO_2$, $Na_2O$, $B_2O_3$ and/or $Al_2O_3$, and 0.1 to 25 wt.-% of a binder selected from waterglass, cement and mixtures thereof, all based on the total weight of the composition. The invention further relates to refractory paints comprising said compositions, and to methods for preparing said paints.

16 Claims, No Drawings

PRECURSORS FOR REFRACTORY PAINTS AND THEIR USE

FIELD OF THE INVENTION

The present invention relates to precursors for the formation of refractory paints and their use in the formation of refractory paints.

BACKGROUND OF THE INVENTION

In thermal processes that occur in industrial furnaces, such as incinerators, cement plants, boilers or others, shell or tubular walls are protected by refractory linings retained by an anchoring system. These anchoring systems are normally made of stainless steel based on iron, chromium and/or nickel, and individual metallic anchors are often the reason of refractory lining failure. In many cases, lifetime of the refractory linings is limited because metallic anchors are damaged, while the refractory material itself is still in good working condition.

Corrosion processes in the furnaces are very complex because many different corrosion mechanisms may occur simultaneously. Furthermore, the conditions often lead to mixed corrosion phenomena. High temperature corrosion (above 300° C.) is the main cause of metallic anchors damages. This corrosion includes two types of corrosion, namely "dry" corrosion and "hot" corrosion. Dry corrosion results from the corrosion of the metal by hot gases, such as for example $O_2$, $CO_2$, $H_2$, chlorine gases (HCl, $Cl_2$) or sulfuric gases ($SO_2$, $SO_3$). Hot corrosion involves the formation of condensed molten salts such as for example sulfates ($Na_2SO_4$, $K_2SO_4$), chlorides (KCl, NaCl) or carbonates ($Na_2CO_3$, $K_2CO_3$). The two mentioned types of corrosion may be linked, since molten salts may be produced by reaction of hot gases with atmospheric impurities (Na, K, S, Cl). Other types of corrosion that occur are pitting corrosion, galvanic corrosion, intergranular corrosion and stress corrosion.

It is known to coat anchors with a corrosion-resistant metallic coating, such as alloy coatings comprising Co, Cr, Ni, Al, with additions of Y, W, Nb or Mo, for example. Chromium carbide coating is also known. However, all these coatings may be expensive and difficult to apply.

Known ceramic coatings present the problem that adhesion of the coating on metal surfaces at high temperature is not satisfactory.

The main cause of refractory degradation is the corrosion of metal anchors. Other parts that may be attacked are kiln shells, heater steel constructions, metallic coolers, tubular walls, and steel parts in general.

Another reason for failure of refractory linings is incomplete or uneven/irregular sintering of a refractory lining, for example when the lining is formed using a dry vibratable mix (DVM). DVMs are installed in their final position of use and compacted manually, mechanically, or most commonly by vibration. Refractory linings resulting from such compaction of a DVM are then heated to their final service temperature, which results in a sintering transformation within the composition. During initial batch runs after installation, the sintering of the DVM may not be complete, or be at different stages at different portions of the refractory lining.

The state of the art therefore constitutes a problem.

SHORT DESCRIPTION OF THE INVENTION

The present invention is defined in the appended claims. In particular, the present invention is embodied by a dry refractory paint precursor composition, comprising 5 to 55 wt.-% mineral filler, 20 to 45 wt.-% glass frit comprising $SiO_2$, $Na_2O$, $B_2O_3$, $Fe_2O_3$, CoO, CaO, $K_2O$, MgO and/or $Al_2O_3$, and 0.1 to 25 wt.-% of a binder selected from waterglass, cement and mixtures thereof, all based on the total weight of the composition. It has been found surprisingly that metallic parts treated with refractory paint compositions obtained from the said dry compositions have improved life time in both oxidative and reductive environments. In particular, it was found that the presence of glass frit lead to improved performance in corrosion tests. It has also been found that refractory paint compositions obtained from the said dry compositions improve the sintering properties of refractory compositions According to one embodiment, the mineral filler comprises aluminosilicate, silica, alumina, and/or mixtures thereof. It was found that refractory paint compositions obtained from the said dry compositions had particularly good anti-corrosion and/or sintering improvement properties.

According to one embodiment, the mineral filler comprises 80 wt.-% or more silica, based on the total weight of mineral filler. For example, the mineral filler comprises 80 wt.-% or more silica and no alumina or aluminosilicate. It was found that such compositions have particularly good sintering improvement properties.

According to one embodiment, the mineral filler consists of aluminosilicate. For example, the aluminosilicate may comprise 30 wt.-% or more $Al_2O_3$, such as for example 55 wt.-% or more $Al_2O_3$. Or, for example, the aluminosilicate may comprise 80 wt.-% or more $SiO_2$. For example, the aluminosilicate may be chamotte.

According to one embodiment, the dry refractory paint precursor composition is a particulate composition. It was found that such mixtures have improved properties regarding dissolution or suspension in water when the refractory paint is formed.

According to one embodiment, the refractory paint precursor composition according to the invention may also comprise from 0.1 to 35 wt.-% magnesia, based on the total weight of the composition. It was found that when magnesia is included, the resulting paint is particularly suitable for use in a foundry.

According to one embodiment, the binder of the refractory paint precursor composition according to the invention may consist of waterglass only, such as for example sodium silicate or sodium metasilicate, such as for example sodium metasilicate pentahydrate. It was found that in this case the resulting refractory paint composition would present improved application properties and improved adhesion on substrate after drying.

According to one embodiment, the binder of the refractory paint precursor composition according to the invention may consist of cement only, such as for example calcium aluminate or Portland cement. It was found that in this case the resulting refractory paint composition would present advantages in safety.

According to one embodiment, the refractory paint precursor composition according to the invention may also comprise up to 2 wt.-% clay, such as from 0.05 to 2 wt.-% clay, and/or up to 5 wt.-% silica fume, such as from 0.05 to 7 wt.-% silica fume, and/or up to 3 wt.-% fluxing agent, such as from 0.5 to 3 wt.-% fluxing agent, which may be boric acid. It was found that the use of clay improves rheological and adhesion properties. It was further found that the use of silica fume allows the formation of a glassy phase at a lower temperature. It was also found that the use of boric acid as a fluxing agent would permit to form a first glassy phase at lower temperature.

According to one embodiment, the refractory paint precursor composition according to the invention may also comprise a rheological agent, such as for example cellulose, such as for example methyl-hydroxyl cellulose. It was found that the presence of a rheological agent may lead to further improved properties of the finished product. The said rheological agent may be present in an amount of 0.1 to 3 wt.-%.

A refractory paint comprising the dry refractory paint precursor composition represents a further embodiment of the present invention. The said refractory paint according to one embodiment may comprise water in an amount of 25 to 65 wt.-%, based on the weight of the dry precursor composition.

In a further embodiment of the invention, a method of formation of a refractory paint is provided, comprising the step of mixing a dry refractory paint precursor composition of the invention with water, for example in an amount of 25 to 65 wt.-%, based on the total weight of dry precursor composition.

In one embodiment, the method of formation of a refractory paint may comprise the addition of a rheological agent, such as for example, the addition of methyl-hydroxyethyl cellulose. It was found that with the addition of cellulose, improved application and adhesion properties of the refractory paint after application could be achieved.

In one embodiment according to the present invention, the refractory paint according to the invention is used for protecting metallic parts from corrosion, such as for example dry corrosion, hot corrosion, pitting corrosion, galvanic corrosion, intergranular corrosion and stress corrosion, or a combination thereof.

In one embodiment according to the present invention, the use of the refractory paint or of the dry refractory paint precursor for protection of metallic parts located underneath a refractory composition, in an industrial furnace, such as in an incinerator, a cement plant, an induction furnace or a boiler, is disclosed. In one further embodiment, the use of the refractory paint or of the dry refractory paint precursor for improving the sintering properties of refractory compositions or refractory precursor compositions is disclosed.

It is understood that the following description concerns exemplary embodiments of the present invention and shall not be limiting the scope of the claims.

DETAILED DESCRIPTION OF THE INVENTION

The present invention according to the appended claims provides dry refractory paint precursor compositions for forming a refractory paint, designed to protect metal parts in corrosive and high-temperature environments, and to improve sintering properties of refractory materials.

According to the present invention, the dry refractory paint precursor compositions comprise from 5 to 55 wt.-% mineral filler, based on the total weight of the composition. The said mineral filler may comprise aluminosilicate, alumina, silica and/or mixtures thereof. For example, the said mineral filler may be an aluminosilicate comprising 30 wt.-% or more $Al_2O_3$, such as for example 55 wt.-% or more $Al_2O_3$, based on the total amount of aluminosilicate, for example 60 wt.-% or more $Al_2O_3$ or for example 70 wt.-% or more $Al_2O_3$, such as for example from 55 to 75 wt.-%, or from 60 to 80 wt.-%, or from 70 to 90 wt.-% $Al_2O_3$, based on the total amount of aluminosilicate. For example the aluminosilicate may be bauxite. Alternatively, the said mineral filler may be an aluminosilicate comprising 80 wt.-% or more $SiO_2$. According to a further embodiment, the said filler may comprise 80 wt.-% or more silica, without comprising any alumina, nor aluminosilicate. For example, the filler may be quartzite, quartz or fused silica.

It has been found that the presence of crushed glass in the form of glass frits in a refractory paint leads to improvements in the corrosion resistance of treated metallic anchors. It was also found that various binders may be used, for example waterglass or cement, or a combination of both.

The dry refractory paint precursor compositions according to the invention were found to show good adhesion on metallic surfaces, both at ambient and at high temperature. In order to improve the ease of preparation of the refractory paint by addition of water to the dry precursor composition, the dry precursor composition may be a particulate composition. For example, the dry precursor composition according to the present invention may be a particular dry precursor composition having a mean particle diameter $D_{50}$ of 0.2 mm or less, as measured by sedimentation using a "Sedigraph". A substantially spherical particulate composition is preferable over aggregates, fibres or other irregularly shaped particles, in order to improve ease of use.

As will be appreciated by those skilled in the art, the particle size distribution of a particulate material may be determined by measuring the sedimentation speeds of the dispersed particles of the particulate material under test through a standard dilute aqueous suspension using a SEDIGRAPH® instrument (e.g., SEDIGRAPH 5100®) obtained from Micromeritics Corporation, USA). The size of a given particle may be expressed in terms of the diameter of a sphere of equivalent diameter (i.e., the "equivalent spherical diameter" or esd), which sediments through the suspension, which may be used to characterize the particulate material. The SEDIGRAPH records the percentage by weight of particles having an esd less than a particular esd value, versus that esd value.

The mineral filler present in the dry refractory paint precursor composition according to the invention may be any suitable mineral filler known to the skilled person. This may derive, for example, from naturally occurring aluminosilicates, for example from andalusite, kyanite, and sillimanite. This may also derive from silica, such as quartz, quartzite, or quartz sand, or particulate silica, such as silica fume and/or fine crushed silica. This may also derive from alumina, such as bauxite, corundum, or other aluminium ores. The mineral filler may also be obtained by mixing particulate silica, such as silica fume and/or fine crushed silica, and alumina. The amount of mineral filler in the composition according to the present invention may be from 5 to 55 wt.-%, such as for example from 10 to 50 wt.-%, or from 15 to 45 wt.-%, based on the total weight of the composition.

The glass frit present in the dry refractory paint precursor composition according to the invention may be crushed glass containing $SiO_2$, $Na_2O$, $B_2O_3$, $Fe_2O_3$, $CoO$, $CaO$, $K_2O$, $MgO$ and/or $Al_2O_3$. For example, the amount of $SiO_2$ in the frit may range from 30 to 70 wt.-%, such as for example from 50 to 60 wt.-%, such as for example about 45 wt.-%, based on the total amount of glass frit. For example, the amount of $Na_2O$ in the frit may range from 2 to 30 wt.-%, such as for example from 5 to 20 wt.-%, such as for example about 16 wt.-%, or for example from 5 to 15 wt.-%, based on the total amount of glass frit. For example, the amount of $B_2O_3$ in the frit may range from 1 to 50 wt.-%, such as for example from 10 to 40 wt.-%, such as for example about 36 wt.-%, or for example from 10 to 20 wt.-%, based on the total amount of glass frit. For example, the amount of $Fe_2O_3$ in the frit may range from 0.01 to 15 wt.-%, such as for example about 0.015 wt.-%, or from 5 to 10 wt.-%, based on the total amount of glass frit. For example, the amount of CoO in the frit may be 1 wt.-% or less, such as for example in the range from 0.1 to 1 wt.-%, such as for example about 0.5 wt.-%, based on the total amount of glass frit. For example, the amount of CaO in the frit may be 5 wt.-% or less, such as for example in the range from 0.01 to 3 wt.-%, such as for example in the range from 0.1 to 2.5 wt.-%, such as for example about 0.5 wt.-%, based on the total amount of glass frit. For example, the amount of $K_2O$ in the frit may be in the range from 0.25 to 15 wt.-%, such as for example in the range from 0.4 to 11 wt.-%, such as for example about 0.5 wt.-%, or about 10 wt.-%, based on the total amount of glass frit. For example, the amount of MgO in the frit may be 1 wt.-% or less, such as for example in the range from 0.1 to 1 wt.-%, such as for example about 0.5 wt.-%, based on the total amount of glass frit. For example, the amount of $Al_2O_3$ in the frit may range from 1 to 10 wt.-%, such as for example from 1.5 to 5 wt.-%, such as for example about 1.7 wt.-%, based on the total amount of glass frit.

The total amount of glass frit present in the dry refractory paint precursor composition according to the invention may be from 30 to 45 wt.-%, based on the total weight of the composition, such as for example from 35 to 43 wt.-%, such as for example about 43 wt.-%.

According to the present invention, the dry refractory paint precursor composition also comprises a binder, selected from waterglass and cement, and mixtures thereof. The total amount of binder in the composition may be from 0.1 to 25 wt.-%, based on the total weight of the dry precursor composition, such as for example from 5 to 23 wt.-%, or from 8 to 20 wt.-%, such as for example about 15 wt.-%. Waterglass is any alkali metal silicate, such as for example a sodium silicate, a potassium silicate, or a lithium silicate, and may preferably be sodium metasilicate ($Na_2SiO_3$; SMS), for example sodium metasilicate pentahydrate. The cement used may be Portland cement or calcium aluminate cement. In one embodiment, the binder may be waterglass, such as for example up to 15 wt.-% waterglass, without the presence of any cement. In one embodiment, the binder may be cement, such as up to 10 wt.-% cement, without the presence of any waterglass. Alternatively, mixtures of waterglass and cement may be used.

According to the present invention, the dry refractory paint precursor may comprise magnesia, such as for example from 0.1 to 35 wt.-% magnesia, based on the total weight of the composition, such as from 0.1 to 25 wt.-% magnesia, or from 0.5 to 20 wt.-% magnesia, or from 20 to 35 wt.-% magnesia, or from 1 to 15 wt.-% magnesia, such as for example about 5 wt.-% magnesia, or about 10 wt.-% magnesia, or about 15 wt.-% magnesia, or about 32 wt.-% magnesia.

Also present in the composition may be from 0.5 to 3 wt.-% of a fluxing agent, such as for example boric acid. Also present in the composition may be from 0.05 to 2 wt.-% clay, such as for example kaolin, bentonite or smectite-based clays, and/or combinations thereof. The amount of clay in the composition may be from 0.1 to 1.5 wt.-%, such as for example from 0.5 to 1.25 wt.-%, such as for example about 1 wt.-%.

According to one aspect of the present invention, a refractory paint may be obtained by mixing the dry precursor composition according to the invention with water. Depending on the exact components of the composition, the water demand may be from 25 wt.-% to 65 wt.-%, based on the total weight of the dry precursor composition. Accordingly, the paint may be obtained by addition of 29 wt.-% water, or 33 wt.-% water, or by addition of 35 wt.-% water, or by addition of 40 wt.-% water, or by addition of 45 wt.-% water, or by addition of 50 wt.-% water, or by addition of 55 wt.-% water, or by addition of 60 wt.-% water for example. It is preferable that the amount of water is adjusted such that the resulting refractory paint has a suitable consistency, rendering it practical or easy to apply the finished refractory paint to the desired surfaces.

The finished paint may be applied by any means known to the skilled person, such as for example by brush, by roller, or by spray-painting. The desired consistency may depend on the method of application that is chosen. According to one embodiment, the finished paint may be used to protect metallic parts from corrosion, such as for example dry corrosion, hot corrosion, pitting corrosion, galvanic corrosion, intergranular corrosion and stress corrosion, or a combination thereof.

According to one further embodiment of the present invention, the finished paint may be used to protect metallic parts in an industrial furnace located underneath a refractory composition, such as in an incinerator, a cement plant, an induction furnace, or a boiler. These parts may be the wall of the furnace vessel, or tubing or structural elements contained therein, or metal anchors used for suspending or securing the refractory composition to the wall of the vessel. According to the present invention, the use of the refractory paint protects said metal components from corrosion caused by heated gases or molten salts.

According to one further embodiment of the present invention, the finished paint may be used to improve sintering of refractory compositions, such as the sintering of DVMs. In the case of particulate DVMs, these are commonly used for forming monolithic refractory linings in furnaces, and installed and compacted in the intended space. Accordingly, when the DVM is installed, it is maintained in place by metallic elements such as plates or panels. It has been found that treatment of the said metallic elements with a refractory paint according to the present invention, sintering properties of the DVMs are improved. In essence, the presence of refractory paints according to the present invention causes a reduction of the temperature required to start a sintering process on a refractory surface, and/or the duration until completion of the sintering process. In the case of a DVM used as a refractory protective layer in an induction furnace, which during initial batches may not yet be fully sintered, the presence of the refractory paint composition according to the present invention accelerates the said sintering process and reduces the risk for metal and/or slag penetration.

Furthermore, during the operation of an induction furnace, penetration of zinc and/or carbon into a refractory protection and onto an inductor may lead to the formation of an electric arc during operation, which may damage the coreless induction surface or the holding furnace. This can also be avoided by additional coating with a refractory paint according to the present invention.

Without wishing to be bound by theory, it is thought that the refractory paint layer according to the present invention helps facilitate localised sintering on the hot side of the DVM, preventing or reducing infiltration and cracking during the sintering process. This may explain the improved sintering properties, as the refractory composition acts as a barrier against corrosive molten metals and vapours at an early stage.

It has further been found that the use of methyl-hydroxyethyl cellulose in the finished refractory paint may present further advantages. Therefore, in a further embodiment of the present invention, cellulose, such as for example methyl-hydroxyethyl cellulose, may be present in the dry refractory precursor composition according to the present invention, in an amount of 3 wt.-% or lower, such as for example from 0.1 to 2 wt.-%, or for example from 0.3 to 1 wt.-%, or for example about 0.3 wt.-% or about 0.5 wt.-%, based on the total amount of the dry particulate precursor composition. In a further embodiment of the present invention, a refractory paint may be obtained by mixing the dry precursor composition according to the invention with water and cellulose, such as for example methyl-hydroxyethyl cellulose. In this embodiment, the amount of cellulose mixed in may be such that the total amount of cellulose in the resulting paint composition may be from 0.1 to 1.5 wt.-%, or for example from 0.3 to 1 wt.-%, or for example about 0.3 wt.-% or about 0.5 wt.-%, based on the total amount of the dry particulate precursor composition.

It has further been found that the refractory paints according to one embodiment of the present invention may improve the sintering properties of refractory compositions or refractory precursor compositions, such as dry vibratable mixes (DVMs). In essence, the presence of refractory paints according to the present invention causes a reduction of the temperature required to start a sintering process on a refractory surface, and/or the duration until completion of the sintering process. In the case of a DVM used as a refractory protective layer in an induction furnace, which during initial batches may not yet be fully sintered, the presence of the refractory paint composition according to the present invention accelerates the said sintering process and reduces the risk for metal and/or slag penetration.

EXAMPLES

Adhesion Testing

A state of the art composition and two compositions according to the present invention were selected to test the adhesion properties of various compositions. In order to evaluate the adhesion properties of the ceramic coating, a metallic anchor was coated using a brush. 24 hours after the application of the coating and storage at ambient temperature, the metallic anchor was immersed/washed in water, in order to test the coating robustness and adhesion on the metallic substrate, and to simulate the suitability of the obtained paint in combination with a gunning product. The test in immersion/washing in water was carried out in order to evaluate the robustness of the paint compared to a gunning product application. In order to evaluate the adhesion on metallic substrate at high temperature, another set of coated metallic anchors was stored at 800° C. for 5 hours.

The compositions tested are listed in the following Table I. All the quantities are indicated in wt.-%, based on the total amount of dry refractory precursor composition. COMP 1 is a commercially available product, INV 1 and INV 2 are products in accordance with embodiments of the present invention.

TABLE I

|  | COMP 1 | INV 1 | INV 2 |
| --- | --- | --- | --- |
| Glass frit "A" | 0 | 43 | 43 |
| Cement | 0 | 8 | 0 |
| Alumina | 10 | 40 | 36 |

TABLE I-continued

|  | COMP 1 | INV 1 | INV 2 |
| --- | --- | --- | --- |
| Silica | 80 | 5 | 5 |
| Clay | 0 | 1 | 1 |
| Cellulose | 0 | 0.3 | 0.5 |
| SMS | 0 | 0 | 15 |
| Water | 30 | 50 | 33 |

It should be noted that the water demand for composition INV 2 (waterglass-based) was notably lower than that of INV 1 (cement-based). The composition of glass frit "A" was $Al_2O_3$: 1.7 wt.-%, $SiO_2$: 45 wt. %, $Na_2O$: 16 wt.-%, $Fe_2O_3$: 0.015 wt.-%, $B_2O_3$: 36 wt.-%, each based on the total weight of glass frit used.

It was found for all three compositions that adhesion after drying at ambient temperature was very good in all cases. However, the adhesion after storage at 800° C. for 5 hours was only 30% for COMP 1, but 80% for INV 1 and 40% in the case of INV 2.

Evaluation of Different Frits

Two different frit compositions were tested. Glass frit "A" as described above and glass frit "B" were used respectively in the composition under INV 2 above. To clarify, the compositions used are shown in Table II:

TABLE II

|  | INV 2 | INV 3 |
| --- | --- | --- |
| Glass frit "A" | 43 | 0 |
| Glass frit "B" | 0 | 43 |
| Alumina | 36 | 36 |
| Silica | 5 | 5 |
| Clay | 1 | 1 |
| Cellulose | 0.5 | 0.5 |
| SMS | 15 | 15 |
| Water | 33 | 33 |

The composition of glass frit "B" was $Al_2O_3$: 3 wt.-%, $SiO_2$: 58 wt. %, $Na_2O$: 10 wt.-%, $Fe_2O_3$: 7.5 wt.-%, $B_2O_3$: 15 wt.-%, CoO: 0.5 wt.-%, each based on the total weight of glass frit used.

It was found for both compositions that adhesion after drying at ambient temperature was very good in all cases. The adhesion after storage at 800° C. for 5 hours was 40% in the case of INV 2 (see above) and 50% in the case of INV 3.

Corrosion Testing

Ceramic coatings COMP 1 and INV 1 as described above, as well as INV 4 and INV 5, were tested in different corrosive atmospheres in order to evaluate their corrosion resistance. Coated and uncoated metallic rods were included in a porous castable refractory (33% of porosity in order to optimize the contact between the coating and the substrate).

To clarify, the compositions used are shown in Table III:

TABLE III

|  | COMP 1 | INV 1 | INV 4 | INV 5 |
| --- | --- | --- | --- | --- |
| Glass frit "A" | 0 | 43 | 36 | 0 |
| Glass frit "B" | 0 | 0 | 0 | 43 |
| Cement | 0 | 8 | 0 | 8 |
| Alumina | 10 | 40 | 40 | 25.4 |
| Silica | 80 | 5 | 5 | 5 |
| Clay | 0 | 1 | 1 | 1 |
| Cellulose | 0 | 0.3 | 1 | 0.5 |

TABLE III-continued

|  | COMP 1 | INV 1 | INV 4 | INV 5 |
|---|---|---|---|---|
| SMS | 0 | 0 | 15 | 15 |
| Water | 30 | 50 | 33 | 33 |

Corrosion tests were performed at 800° C. during 200 hours with the following corrosive environments: (A) Corrosion by chloride salts in an oxidizing atmosphere (NaCl and KCl) at 800° C. for 200 hours; and (B) Corrosion by sulfate and chloride salts in a reductive atmosphere ($K_2SO_4$, $Na_2SO_4$, $Ca_2SO_4$, NaCl, KCl coke and graphite). Corrosion tests in various atmospheres were carried out on the coated rods. In these tests, all rods have the same shape (rod in AISI 304, 100 mm length and 8 mm in diameter). After each corrosion test, all pieces were cleaned in a water bath containing 15% HCl (85%) at 70 to 80° C. during 1 h.

In order to evaluate the corrosion resistance, the loss of weight of each metallic rod was measured after the corrosion test.—Various formulations were tested with following modification, ie. variation of the amount of frits (36% or 43%), variation of the quality of glass frits (glass frit "A" or glass frit "B"), variation of the binder (cement and/or sodium metasilicate), and use of cellulose as an additive powder. The results of the corrosion tests are presented in Table IV.

TABLE IV

|  |  | Loss of weight Test (A) | Loss of weight Test (B) |
|---|---|---|---|
| Uncoated |  | −22.8% | −19.7% |
| COMP 1 |  | −32.4% | −13.6% |
| INV 1 | Glass frit "A" | −14.3% | −12.4% |
| INV 4 | Glass frit "A" | −18.9% | −10.5% |
| INV 5 | Glass frit "B" | −17.4% | −10.0% |

It can be clearly seen that improved results are obtained for the coatings according to the present invention. Furthermore, higher glass frit content also leads to slightly improved results.

It should be noted that the present invention may comprise any combination of the features and/or limitations referred to herein, except for combinations of such features which are mutually exclusive. The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A dry refractory paint precursor composition comprising:
   5 to 55 wt.-% mineral filler comprising aluminosilicate, silica, alumina, and/or mixtures thereof;
   20 to 45 wt.-% glass frit comprising $SiO_2$, $Na_2O$, $B_2O_3$, $Fe_2O_3$, CoO, CaO, $K_2O$, MgO and/or $Al_2O_3$; and
   0.1 to 25 wt.-% of a binder selected from waterglass, cement and mixtures thereof, all based on the total weight of the composition;
   wherein the mineral filler comprises 30 wt.-% or more $Al_2O_3$.

2. A dry refractory paint precursor composition according to claim 1, wherein the dry refractory paint precursor composition is a particulate composition.

3. A dry refractory paint precursor composition according to claim 1, further comprising 0.1 to 35 wt.-% magnesia, based on the total weight of the composition.

4. A dry refractory paint precursor composition according to claim 1, wherein the binder comprises waterglass, further wherein the waterglass is selected from sodium silicate, sodium metasilicate, or sodium metasilicate pentahydrate.

5. A dry refractory paint precursor composition according to claim 1, wherein the binder consists of calcium aluminate or Portland cement.

6. A dry refractory paint precursor composition according to claim 1, further comprising from 0.5 to 3 wt.-% boric acid or a fluxing agent.

7. A dry refractory paint precursor composition according to claim 1, further comprising from 0.1 to 3 wt.-% of a rheological agent, wherein the rheological agent is selected from cellulose or methyl-hydroxyethyl cellulose.

8. A refractory paint comprising the dry refractory paint precursor composition of claim 1.

9. A method of preparing a refractory paint, comprising mixing a dry refractory paint precursor composition of claim 1 with 65 wt.-% water, based on the total weight of the dry refractory paint precursor composition.

10. A method of preparing a refractory paint according to claim 9, further comprising adding methyl-hydroxyethyl cellulose.

11. A method comprising applying a refractory paint according to claim 8 to a metallic part to protect said metallic part from dry corrosion, hot corrosion, pitting corrosion, galvanic corrosion, intergranular corrosion, stress corrosion, or another form of corrosion.

12. A method comprising applying a refractory paint according to claim 8 to a metallic part in an industrial furnace.

13. A method comprising applying a refractory paint according to claim 8 to a substrate, wherein applying the refractory paint improves a sintering property of a refractory composition or a refractory precursor composition.

14. A dry refractory paint precursor composition comprising:
   5 to 55 wt.-% mineral filler comprising aluminosilicate, silica, alumina, and/or mixtures thereof;
   20 to 45 wt.-% glass frit comprising $SiO_2$, $Na_2O$, $B_2O_3$, $Fe_2O_3$, CoO, CaO, $K_2O$, MgO and/or $Al_2O_3$; and
   0.1 to 25 wt.-% of a binder selected from waterglass, cement and mixtures thereof, all based on the total weight of the composition;
   wherein the mineral filler comprises 80 wt.-% or more $SiO_2$.

15. A dry refractory paint precursor composition comprising:
   5 to 55 wt.-% mineral filler;
   20 to 45 wt.-% glass frit comprising $SiO_2$, $Na_2O$, $B_2O_3$, $Fe_2O_3$, CoO, CaO, $K_2O$, MgO and/or $Al_2O_3$; and
   0.1 to 25 wt.-% of a binder selected from waterglass, cement and mixtures thereof, all based on the total weight of the composition,
   further comprising from 0.05 to 2 wt.-% clay in addition to the mineral filler, wherein the clay is selected from kaolin, bentonite, smectite, and/or mixtures thereof.

16. A dry refractory paint precursor composition comprising:

5 to 55 wt.-% mineral filler;
20 to 45 wt.-% glass frit comprising $SiO_2$, $Na_2O$, $B_2O_3$, $Fe_2O_3$, CoO, CaO, $K_2O$, MgO and/or $Al_2O_3$; and
0.1 to 25 wt.-% of a binder selected from waterglass, cement and mixtures thereof, all based on the total weight of the composition,
further comprising from 0.05 to 7 wt.-% silica fume in the composition in addition to the mineral filler.

* * * * *